United States Patent [19]

Lammers

[11] 4,197,999
[45] Apr. 15, 1980

[54] BOOM STABILIZING SUPPORT ASSEMBLY

[75] Inventor: Walter Lammers, Boyden, Iowa

[73] Assignee: Dethmers Manufacturing Company, Boyden, Iowa

[21] Appl. No.: 923,212

[22] Filed: Jul. 10, 1978

[51] Int. Cl.² .............................................. B05B 1/20
[52] U.S. Cl. ................................................... 239/166
[58] Field of Search ............... 239/166, 169, 167, 172, 239/175, 170

[56] References Cited

U.S. PATENT DOCUMENTS

| | | | |
|---|---|---|---|
| 3,544,009 | 12/1970 | Schlueter | 239/167 |
| 3,927,832 | 12/1975 | Robison et al. | 239/169 |
| 4,039,147 | 8/1977 | Hugg | 239/167 |

Primary Examiner—James B. Marbert
Attorney, Agent, or Firm—Rudolph L. Lowell; G. Brian Pingel

[57] ABSTRACT

A stabilizing support assembly for movably mounting a horizontally extended boom to one end of a portable frame. The support assembly has a pair of spaced apart parallel link systems each of which interconnect the portable frame and the boom, a spring member interconnected with each of the link systems to resiliently support the boom from the frame, shock absorbing members interconnected with each of the link systems to dampen up and down oscillatory movement of the boom, and torsion members fixed to and extended between the link systems for restricting horizontal tilting movement of the boom.

5 Claims, 4 Drawing Figures

BOOM STABILIZING SUPPORT ASSEMBLY

BACKGROUND OF THE INVENTION

1. Field of the Invention

The present invention relates in general to booms employed in spraying agricultural crops and, more specifically, to support assemblies for mounting such booms on a portable frame.

2. Description of the Prior Art

Standard equipment presently employed for spraying chemical herbicides, pesticides or the like on agricultural crops includes a portable frame for carrying a chemical storage tank and a spray boom extended transversely adjacent one end of the frame. The spray boom has a plurality of spaced spray nozzles mounted thereon, and a pump and associated spray lines transfer the chemical from the storage tank to the spray nozzles.

To reduce the amount of time involved in spraying a field, long spray booms are being used that extend outwardly in cantilever fashion from opposite sides of the portable frame or vehicle on which they are mounted. A primary problem inherent in the use of spray booms of extreme length is that the rough terrain often encountered by the vehicles on which they are mounted subjects the booms to jarring or whipping forces that makes it difficult to stabilize the booms and maintain a uniform spraying pattern.

Various devices for mounting a boom to an implement have been employed to increase boom stability, such as those disclosed in U.S. Patents to Tangeman, U.S. Pat. No. 3,545,678 and Hugg, U.S. Pat. No. 4,039,147. The Tangeman reference discloses a boom stabilizing device that includes a pair of parallel link type systems for connecting a boom to an implement. Springs are connected between portions of the link systems, and the pivotal connections of the links forming the link systems include rubber bushings to provide a resilient support for the boom.

The Hugg reference also discloses the use of parallel link systems for mounting a boom to an implement in a stabilized manner. Thus, use of parallel link systems alone for mounting a spray boom is clearly old in the art, but such systems per se have not overcome objectionable sway and oscillatory movements of the boom.

The present invention relates in general to that of Tangeman in that it includes a pair of parallel link systems and coil springs for resiliently supporting the boom. However, in addition, shock absorbing means are provided to dampen oscillatory movement of the boom, and torsion members are fixed to and extend between the link systems to restrict horizontal tilting movement of the boom.

SUMMARY OF THE INVENTION

The present invention provides a stabilizing support assembly for pivotally mounting a horizontally extended boom means to one end of a portable frame to provide a controlled movement of the boom means relative to the frame in order that jarring or whipping forces to which the frame is exposed are not directly transmitted to the boom.

The support assembly includes a pair of spaced apart parallel link systems, each of which includes a first upright link fixed to the portable frame, a second upright link fixed to the boom means, and upper and lower connecting links extended between and pivotally interconnected to the upper and lower portions of the upright links. A yieldable means is interconnected in each of the link systems to provide a resilient support for the boom means that permits a floating vertical movement thereof relative to the frame. To dampen excessive floating movement so that it does not become oscillatory as the frame is repeatedly exposed to jarring or whipping forces, shock absorbing means are interconnected in each of the link systems. Furthermore, the parallel link systems are connected together by torsion means that are fixed to and extend therebetween to restrict horizontal tilting movement of the boom means. Consequently, the movement of the link systems complement one another rather than acting independently of each other.

DESCRIPTION OF THE PREFERRED EMBODIMENT

Figure 1:
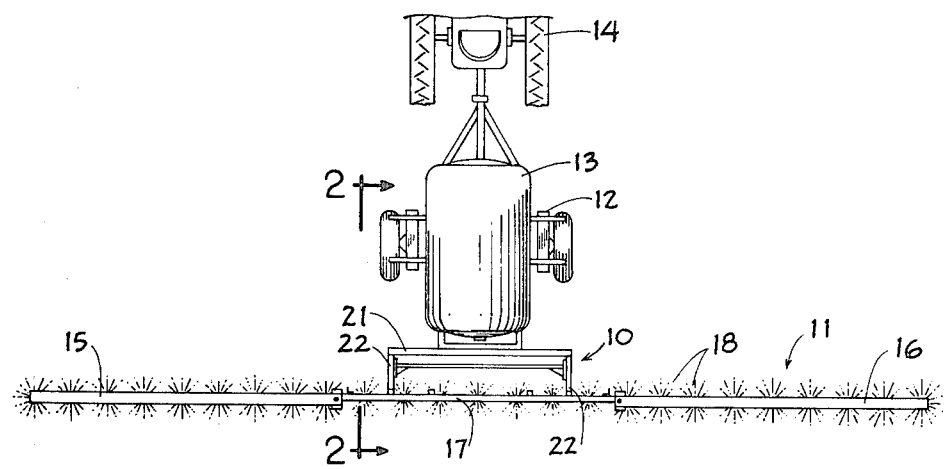
FIG. 1 is a plan view of the stabilizing support assembly of the present invention in assembly relation with a boom and a portable tank trailer coupled to a tractor vehicle.

The present invention provides a stabilizing support assembly for a horizontally extended spray boom, and is shown generally at 10 in FIG. 1 in assembly relation with a boom 11 and a portable frame 12 on which the boom is mounted. The portable frame 12 carries a chemical storage container 13 and is attached to a pulling vehicle 14 by suitable means. The boom 11 is formed of a pair of outer boom sections 15 and 16 that are substantially mirror images of one another and are pivotally connected to opposite ends of a center boom section 17. A plurality of spaced apart spray nozzles 18 are mounted on the boom 11 and are connected by hoses (not shown) to the storage container 13 for spraying chemicals contained therein.

Figure 2:
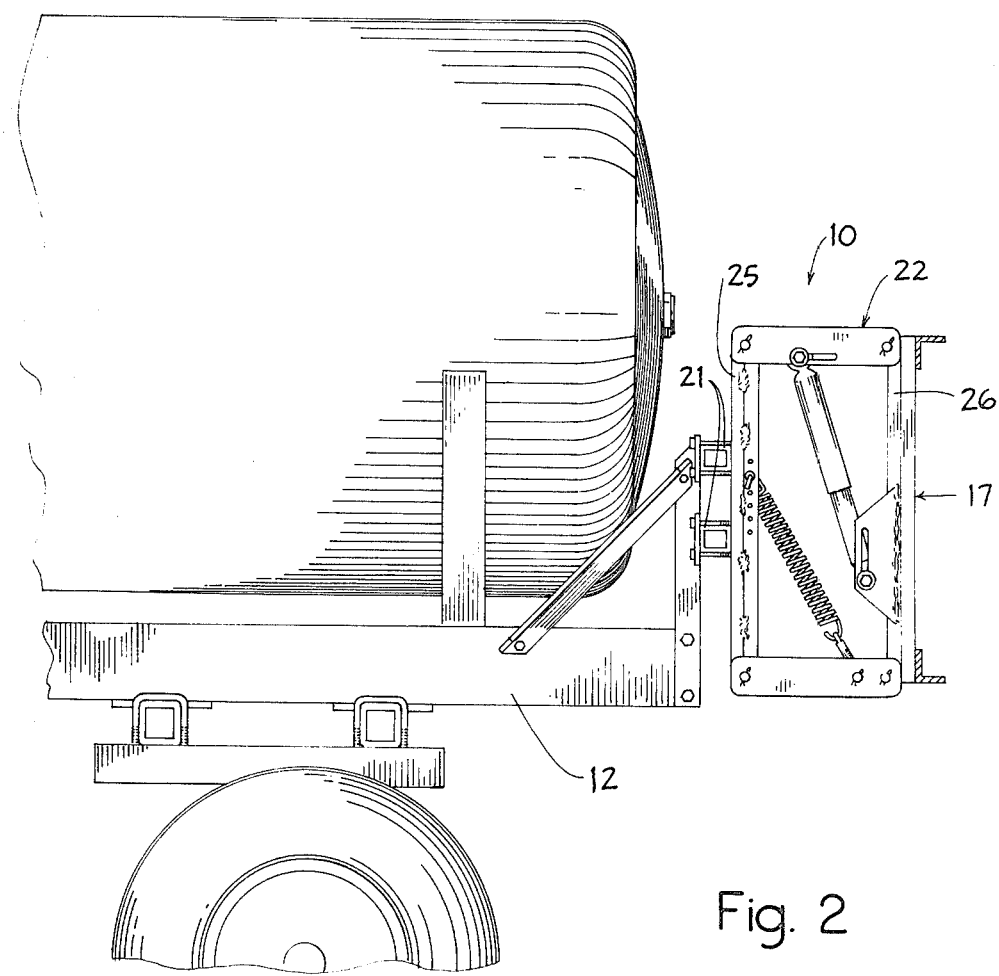
FIG. 2 is an enlarged side view of the support assembly of FIG. 1 as seen along line 2—2, with the boom shown in section.
Figure 3:
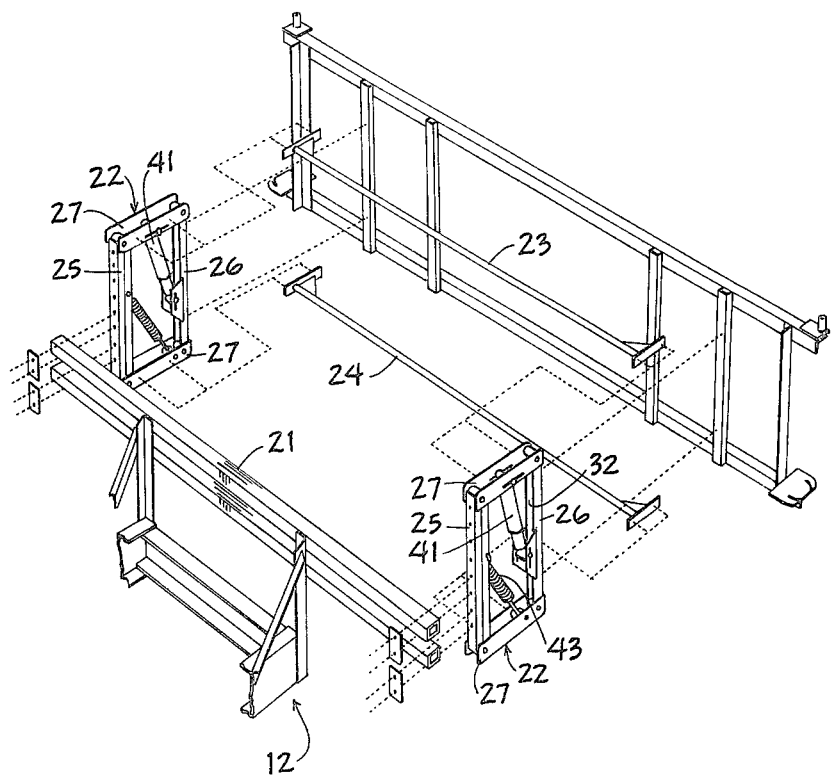
FIG. 3 is an exploded perspective view of the support assembly, the center boom section, and an end portion of the portable frame of FIG. 2.
Figure 4:
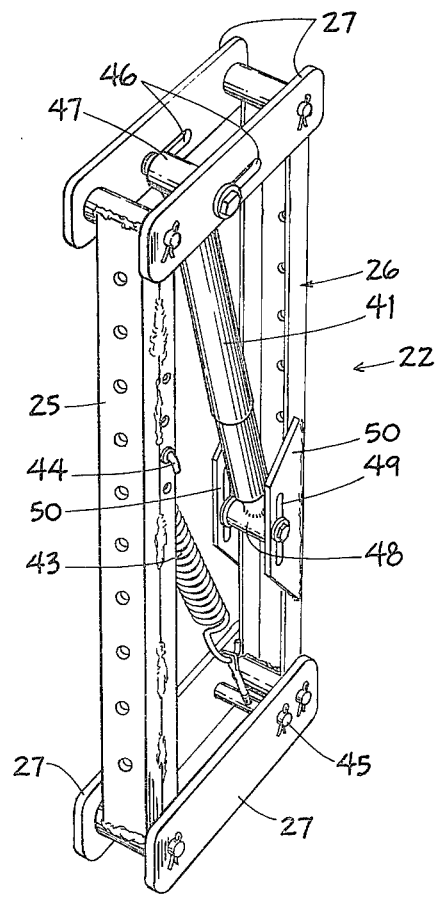
FIG. 4 is an enlarged detail perspective view of a parallel link system forming part of the support assembly of FIG. 1.

Referring now to FIGS. 2 and 3, the support assembly 10 is adapted to provide a resilient support between the portable frame 12 and the boom 11, and is connected to the center boom section 17 and a pair of support bars 21 mounted on and extended transversely of an end of the portable frame 12. The assembly 10 is formed of two spaced apart parallel link systems 22 that are connected together at their upper and lower portions by torsion bars 23 and 24, respectively, (FIG. 3).

Each of the link systems 22 includes front and rear parallel upright links 25 and 26, respectively, and preferably two pairs of parallel links 27 pivotally connected to opposite ends of the links 25 and 26. The front upright links 25 are bolted to the support bars 21 by "U" clamps (not shown) and the rear upright links 26 are attached to the boom section 17 by assemblies (also not shown). The pairs of parallel links 27 are pivotally connected to the upper and lower ends of the upright links 25 and 26.

To resiliently support the boom 10, a stiff coil spring 43 is pin connected at 44 and 45 to the front upright link 25 and the lower links 27, respectively, of each link system 22. Thus, as the portable frame 12 is pulled over rough terrain, the boom 11 is floatingly supported by the link systems 22, so that jarring forces applied on the portable frame 12 are cushioned and not directly transmitted to the boom 11 and the boom is permitted to move vertically independent of the frame 12.

To insure that such movement does not become oscillatory as the frame 12 is repeatedly subjected to jarring forces, a standard type shock absorber 41 is associated with each of the link systems 22. The upper links 27 have parallel, longitudinally extended, medial slots 46 in which one end of each of the shock absorbers 41 is slidably supported at 47. The opposite ends of the shock absorbers 41 are in a lost motion connection 49 with brackets 50 attached to the forward sides of the links 26. The pin and slot connections of the ends of the shock absorbers 41 to the links 26 and 27 serve as lost motion connections that dampen a free floating movement of the boom.

Together the link systems 22, with their associated springs 43 and shock absorbers 41, provide a floating support system for the boom 11 to substantially reduce excessive oscillatory movement to maintain a level ride for the boom. However, when traveling over inclined terrain or when jarring forces are subjected unevenly on the portable frame 12, the boom 11 has a tendency to tilt horizontally. To reduce such horizontal tilting movement to a minimum, the torsion bars 23 and 24 are fixed, respectively, to the upper and lower pairs of links 27 of the two link systems 22 to thereby tie the link systems 22 together for coacting movement. Thus, the link systems 22 must act in conjunction with one another rather than acting independently of each other. It is seen, therefore, that any tendency of the pairs of links 27 of one link system to pivot in one direction is directly counteracted by the tendency of the pairs of links 27 of the other link system to resist such pivotal movement. Thus, should one boom end section want to tilt downwardly, such tilting would be counteracted by the opposite boom end section, which is not subjected to any tilting tendency. Greater boom stability is thus attained to provide a substantially parallel ride of the boom relative to the surface of the terrain being traveled. As a result, the support assembly 10 provides a highly efficient means for supporting a boom on a portable frame to provide a uniform spraying pattern.

Although the invention has been described with respect to a preferred embodiment thereof, it is to be understood that it is not to be so limited since changes and modifications can be made therein which are within the full intended scope of this invention as defined by the appended claims.

I claim:

1. A stabilizing support assembly for movably mounting a horizontally extended boom means transversely of and to one end of a portable frame, said assembly comprising:
    (a) a pair of transversely spaced apart parallel link systems each of which includes a first upright link fixed to the portable frame, a second upright link fixed to the boom means, and upper and lower links extended, respectively, between and interconnected to the upper and lower portions of said upright links,
    (b) yieldable means interconnected with each of said link systems to provide each of said link systems with a floating support for said boom means, which supports act independently of one another,
    (c) a shock absorbing means interconnected with and independently associated with each of said link systems to dampen up and down oscillatory movement of said boom means, and
    (d) torsion means fixed to and extended between said link systems for reducing relative horizontal tilting movement of opposite ends of said boom means.

2. A stabilizing support assembly according to claim 1, wherein said assembly further comprises:
    (a) lost motion means for connecting said shock absorbing means to said link systems so that said systems have a limited freedom of movement with respect to said shock absorbing means.

3. A stabilizing support assembly according to claim 2, wherein said lost motion means comprises:
    (a) lost motion connections for connecting the ends of said shock absorbers to said upright links and one of said upper and lower connecting links.

4. A stabilizing support assembly for movably mounting a horizontally extended boom means transversely of and to one end of a portable frame, said assembly comprising:
    (a) a pair of transversely spaced apart parallel link systems each of which includes a first upright link fixed to the portable frame, a second upright link fixed to the boom means, and upper and lower connecting links extending respectively, between the upper and lower portions of said upstanding links,
    (b) yieldable means associated with each of said link systems and connected to and extended between said first upright link and said lower connecting links to provide each of said link systems with a resilient support for said boom means which supports act independently of one another,
    (c) a shock absorbing means independently associated with each of said link systems and connected to and extended between the other one of said upright links and said upper connecting links thereof to dampen up and down oscillatory movement of said boom means, and
    (d) torsion means fixed to and extended between said link systems for reducing relative horizontal tilting movement between opposite ends of said boom means.

5. A stabilizing support assembly for pivotally mounting a horizontally extended boom transversely of and to one end of a portable frame, said assembly comprising:
    (a) a boom supporting structure for said boom,
    (b) a pair of transversely spaced apart parallel link systems each of which includes a first upright link fixed to the portable frame, a second upright link fixed to the boom supporting structure, and upper and lower connecting links extended respectively, between and connected to the upper and lower portions of said upright links,
    (c) yieldable means interconnected with each of said link systems to provide each of said link systems with a resilient support for said boom supporting structure, which supports are independent of one another,
    (d) shock absorbing means interconnected with and independently associated with each of said link systems to dampen oscillatory movement of said boom supporting structure, and
    (e) torsion means fixed to and extended between said link systems for reducing horizontal tilting movement of said boom supporting structure.

* * * * *